United States Patent
Lock et al.

(10) Patent No.: US 10,442,889 B2
(45) Date of Patent: Oct. 15, 2019

(54) COATING COMPOSITION COMPRISING A BINDER FORMED FROM POLYESTER AND A PHOSPHORUS ACID

(71) Applicant: PPG Industries Ohio, Inc., Cleveland, OH (US)

(72) Inventors: Kam L. Lock, Orpington (GB); Richard A. Woods, Wimbish-Saffron Walden (GB)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 15/528,415

(22) PCT Filed: Nov. 27, 2015

(86) PCT No.: PCT/EP2015/077957
§ 371 (c)(1),
(2) Date: May 19, 2017

(87) PCT Pub. No.: WO2016/083596
PCT Pub. Date: Jun. 2, 2016

(65) Prior Publication Data
US 2017/0335060 A1    Nov. 23, 2017

(30) Foreign Application Priority Data
Nov. 27, 2014 (EP) .................................... 14195098

(51) Int. Cl.
C08L 67/00 (2006.01)
C08G 63/692 (2006.01)
C09D 167/00 (2006.01)

(52) U.S. Cl.
CPC .......... *C08G 63/6924* (2013.01); *C08L 67/00* (2013.01); *C09D 167/00* (2013.01)

(58) Field of Classification Search
USPC ................................ 528/271, 272, 274, 287
See application file for complete search history.

(56) References Cited

U.S. PATENT DOCUMENTS

| | | |
|---|---|---|
| 2007/0009742 A1 | 1/2007 | Pawlik et al. |
| 2012/0301645 A1 | 11/2012 | Moussa et al. |
| 2012/0301646 A1 | 11/2012 | List et al. |
| 2012/0301647 A1 | 11/2012 | Moussa et al. |

FOREIGN PATENT DOCUMENTS

| | | | |
|---|---|---|---|
| GB | 1374633 | * | 11/1974 |
| WO | 02072664 | * | 9/2002 |

* cited by examiner

*Primary Examiner* — Terressa Boykin
(74) *Attorney, Agent, or Firm* — Lisa E. Geary, Esq.

(57) ABSTRACT

Coating compositions that include a binder formed from a polyester and a phosphorus acid are disclosed. The binder includes a polyester material formed as the reaction product of a polyacid, a polyol, and a phosphorous acid, wherein the polyester material has a number-average molecular weight (Mn) from about 1,000 Da to 25,000 Da and a polydispersity index (Mw/Mn) of from about 1 to 10. The polyester material is present in the binder composition in amounts of more than about 10 weight percent (wt %). The coating compositions are useful for coating food and/or beverage containers.

18 Claims, No Drawings

COATING COMPOSITION COMPRISING A BINDER FORMED FROM POLYESTER AND A PHOSPHORUS ACID

CROSS-REFERENCE TO RELATED APPLICATIONS

This application is a National Stage entry of International Application No. PCT/EP2015/077957, filed Nov. 27, 2015, which claims priority to EPO Application No. 14195098.0, filed Nov. 27, 2014, the contents of which are incorporated herein.

The present invention relates to coating compositions and in particular to coating compositions comprising polyesters and substrates to which such coating compositions are applied. The present invention also extends to food and beverage containers coated with said coating compositions.

A wide variety of coatings have been used to coat food and beverage containers. The coating compositions preferably display certain properties such as being capable of high speed application, having excellent adhesion to the substrate, being safe for food contact and having properties, once cured, that are suitable for their end use.

Many of the coating compositions currently used for food and beverage containers contain epoxy resins. Such epoxy resins are typically formed from polyglycidyl ethers of bisphenol A (BPA). BPA is perceived as being harmful to human health and it is therefore desirable to eliminate it from coatings for food and beverage packaging containers. Derivatives of BPA such as diglycidyl ethers of bisphenol A (BADGE), epoxy novolak resins and polyols prepared from BPA and bisphenol F (BPF) are also problematic. Therefore there is a need to provide coating compositions for food and beverage containers which are free from BPA, BADGE and/or other derivatives but retain the required properties as described above.

Polyester resins produced by the polycondensation reaction of polyols and polyacids are well known in the coatings industry. Both linear and branched polyesters have been widely used in coating compositions. Further, they have been used to coat a variety of substrates such as metallic and non-metallic substrates.

It is an object of aspects of the present invention to provide one or more solutions to one of the above mentioned or other problems.

According to a first aspect of the present invention there is provided a coating composition comprising a binder, the binder comprising a polyester material, wherein the polyester material comprises the reaction product of;
 (a) a polyacid,
 (b) a polyol and
 (c) a phosphorous acid,
wherein the polyester material has a weight-average molecular weight (Mn) from about 1,000 Da to 25,000 Da;
and wherein the polydispersity index (Mw/Mn) of the polyester material is from about 1 to 10
characterised in that the polyester material is present in said binder composition in amounts of more than about 10 weight percent (wt %).

"Polyacid" and like terms as used herein, refers to a compound having two or more carboxylic acid groups, such as two, three or four acid groups, and includes an ester of the polyacid (wherein one or more of the acid groups is esterified) or an anhydride. The polyacid is suitably an organic polyacid.

In certain embodiments, the polyacid may be an aliphatic acid, an aromatic acid, a cycloaliphatic acid or a combination thereof. Suitably, the carboxylic acid groups of the polyacid may be connected by a bridging group selected from: an alkylene group; an alkenylene group; an alkynylene group; or an arylene group.

In certain embodiments, the polyacid may be saturated, aromatic or unsaturated.

Suitable examples of saturated polyacids include, but are not limited to one or more of the following: adipic acid; azelaic acid; succinic acid; sebacic acid; glutaric acid; decanoic diacid; dodecanoic diacid; hexahydrophthalic acid; methylhexahydrophthalic acid; cyclohexane dicarboxylic acid; 1,3-cyclohexane dicarboxylic acid; 1,4-cyclohexane dicarboxylic acid; tricyclodecane polycarboxylic acid; cyclohexanetetra carboxylic acid; cyclobutane tetracarboxylic; acid anhydrides and esters, such as dimethyl esters, of all the aforementioned acids and combinations thereof.

Suitable examples of aromatic polyacids include, but are not limited to one or more of the following: phthalic acid; isophthalic acid; tetrachlorophthalic acid; 5-tert-butylisophthalic acid; naphthalene dicarboxylic acid; naphthalene tetracarboxylic acid; terephthalic acid; dimethyl terephthalate; trimellitic acid; acid anhydrides and esters, such as dimethyl esters, of all the aforementioned acids and combinations thereof.

Suitable examples of unsaturated polyacids include, but are not limited to one or more of the following: maleic acid; fumaric acid; itaconic acid; tetrahydrophthalic acid; chlorendic acid; endomethylene tetrahydrophthalic acid; endoethylene hexahydrophthalic acid; acid anhydrides and esters, such as dimethyl esters, of all the aforementioned acids and combinations thereof.

In certain embodiments, the polyacid may comprise terephthalic acid, isophthalic acid, maleic anhydride, itaconic acid, 1,4-cyclohexane dicarboxylic acid, adipic acid, succinic acid, succinic anhydride; sebacic acid or a combination thereof.

In certain embodiments, the polyacid may comprise terephthalic acid, isophthalic acid, 1,4-cyclohexane dicarboxylic acid, maleic anhydride, itaconic acid or a combination thereof.

In certain embodiments, the polyacid may comprise 1,4-cyclohexane dicarboxylic acid, terephthalic acid, isophthalic acid, adipic acid, succinic acid, succinic anhydride, sebacic acid or a combination thereof.

"Polyol" and like terms, as used herein, refers to a compound having two or more hydroxyl groups, such as two, three or four hydroxyl groups. In certain embodiments, the hydroxyl groups of the polyol may be connected by a bridging group selected from: an alkylene group; an alkenylene group; an alkynylene group; or an arylene group. Suitably the polyol is an organic polyol.

Suitable examples of polyols include, but are not limited to one or more of the following: alkylene glycols, such as ethylene glycol; propylene glycol; diethylene glycol; dipropylene glycol; triethylene glycol; tripropylene glycol; hexylene glycol; polyethylene glycol; polypropylene glycol and neopentyl glycol; hydrogenated bisphenol A; cyclohexanediol; propanediols including 1,2-propanediol; 1,3-propanediol; butyl ethyl propanediol; 2-methyl-1,3-propanediol; and 2-ethyl-2-butyl-1,3-propanediol; butanediols including 1,4-butanediol; 1,3-butanediol; and 2-ethyl-1,4-butanediol; pentanediols including trimethyl pentanediol and 2-methylpentanediol; cyclohexanedimethanol (CHDM); hexanediols including 1,6-hexanediol; caprolactonediol (for example, the reaction product of epsilon-capro lactone and ethylene glycol); hydroxyalkylated bisphenols; polyether glycols, for example, poly(oxytetramethylene) glycol; trimethylol propane; pentaerythritol; di-pentaerythritol; trimethylol ethane; trimethylol butane; dimethylol cyclohexane; glycerol and the like or combinations thereof. Suitably, the polyol may comprise ethylene glycol, 2-methyl-1,3-propanediol, 1, 2 propanediol, cyclohexanedimethanol (CHDM), trimethylol propane or glycerol or a combination thereof.

In certain embodiments, the polyol may be unsaturated. Suitable examples of unsaturated polyols include, but are not limited to one or more of the following: trimethylol propane monoallyl ether; trimethylol ethane monoallyl ether; prop-1-ene-1,3-diol; but-2-ene-1,4-diol or combinations thereof.

The term "alk" or "alkyl", as used herein unless otherwise defined, relates to saturated hydrocarbon radicals being straight, branched, cyclic or polycyclic moieties or combinations thereof and contain 1 to 20 carbon atoms, preferably 1 to 10 carbon atoms, more preferably 1 to 8 carbon atoms, still more preferably 1 to 6 carbon atoms, yet more preferably 1 to 4 carbon atoms. These radicals may be optionally substituted with a chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, aryl or Het, wherein $R^{19}$ to $R^{27}$ each independently represent hydrogen, aryl or alkyl, and/or be interrupted by one or more oxygen or sulphur atoms, or by silano or dialkylsiloxane groups. Examples of such radicals may be independently selected from methyl, ethyl, n-propyl, isopropyl, n-butyl, isobutyl, sec-butyl, tert-butyl, 2-methylbutyl, pentyl, iso-amyl, hexyl, cyclohexyl, 3-methylpentyl, octyl and the like. The term "alkylene", as used herein, relates to a bivalent radical alkyl group as defined above. For example, an alkyl group such as methyl which would be represented as —CH$_3$, becomes methylene, —CH$_2$—, when represented as an alkylene. Other alkylene groups should be understood accordingly.

The term "alkenyl", as used herein, relates to hydrocarbon radicals having one or several, preferably up to 4, double bonds, being straight, branched, cyclic or polycyclic moieties or combinations thereof and containing from 2 to 18 carbon atoms, preferably 2 to 10 carbon atoms, more preferably from 2 to 8 carbon atoms, still more preferably 2 to 6 carbon atoms, yet more preferably 2 to 4 carbon atoms. These radicals may be optionally substituted with a hydroxyl, chloro, bromo, iodo, cyano, nitro, $OR^{19}$, $OC(O)R^{20}$, $C(O)R^{21}$, $C(O)OR^{22}$, $NR^{23}R^{24}$, $CO)NR^{25}R^{26}$, $SR^{27}$, $C(O)SR^{27}$, $C(S)NR^{25}R^{26}$, or aryl, wherein $R^{19}$ to $R^{27}$ each independently represent hydrogen, aryl or alkyl, and/or be interrupted by one or more oxygen or sulphur atoms, or by silano or dialkylsiloxane groups. Examples of such radicals may be independently selected from alkenyl groups include vinyl, allyl, isopropenyl, pentenyl, hexenyl, heptenyl, cyclopropenyl, cyclobutenyl, cyclopentenyl, cyclohexenyl, 1-propenyl, 2-butenyl, 2-methyl-2-butenyl, isoprenyl, farnesyl, geranyl, geranylgeranyl and the like. The term "alkenylene", as used herein, relates to a bivalent radical alkenyl group as defined above. For example, an alkenyl group such as ethenyl which would be represented as —CH═CH$_2$, becomes ethenylene, —CH═CH—, when represented as an alkenylene. Other alkenylene groups should be understood accordingly.

The term "alkynyl", as used herein, relates to hydrocarbon radicals having one or several, preferably up to 4, triple bonds, being straight, branched, cyclic or polycyclic moieties or combinations thereof and having from 2 to 18 carbon atoms, preferably 2 to 10 carbon atoms, more preferably from 2 to 8 carbon atoms, still more preferably from 2 to 6 carbon atoms, yet more preferably 2 to 4 carbon atoms. These radicals may be optionally substituted with a hydroxy, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(OS)SR^{27}$, $C(S)NR^{25}R^{26}$ or aryl, wherein $R^{19}$ to $R^{27}$ each independently represent hydrogen, aryl or lower alkyl, and/or be interrupted by one or more oxygen or sulphur atoms, or by silano or dialkylsiloxane groups. Examples of such radicals may be independently selected from alkynyl radicals include ethynyl, propynyl, propargyl, butynyl, pentynyl, hexynyl and the like. The term "alkynylene", as used herein, relates to a bivalent radical alkynyl group as defined above. For example, an alkynyl group such as ethynyl which would be represented as —C≡CH, becomes ethynylene, —C≡C—, when represented as an alkynylene. Other alkynylene groups should be understood accordingly.

The term "aryl" as used herein, relates to an organic radical derived from an aromatic hydrocarbon by removal of one hydrogen, and includes any monocyclic, bicyclic or polycyclic carbon ring of up to 7 members in each ring, wherein at least one ring is aromatic. These radicals may be optionally substituted with a hydroxy, chloro, bromo, iodo, cyano, nitro, $OR^{19}$, $OC(O)R^{20}$, $C(O)R^{21}$, $C(O)OR^{22}$, $NR^{23}R^{24}$, $C(O)NR^{25}R^{26}$, $SR^{27}$, $C(O)SR^{27}$, $C(S)NR^{25}R^{26}$, or aryl, wherein $R^{19}$ to $R^{27}$ each independently represent hydrogen, aryl or lower alkyl, and/or be interrupted by one or more oxygen or sulphur atoms, or by silano or dialkylsilcon groups. Examples of such radicals may be independently selected from phenyl, p-tolyl, 4-methoxyphenyl, 4-(tert-butoxy)phenyl, 3-methyl-4-methoxyphenyl, 4-fluorophenyl, 4-chlorophenyl, 3-nitrophenyl, 3-aminophenyl, 3-acetamidophenyl, 4-acetamidophenyl, 2-methyl-3-acetamidophenyl, 2-methyl-3-aminophenyl, 3-methyl-4-aminophenyl, 2-amino-3-methylphenyl, 2,4-dimethyl-3-aminophenyl, 4-hydroxyphenyl, 3-methyl-4-hydroxyphenyl, 1-naphthyl, 2-naphthyl, 3-amino-1-naphthyl, 2-methyl-3-amino-1-naphthyl, 6-amino-2-naphthyl, 4,6-dimethoxy-2-naphthyl, tetrahydronaphthyl, indanyl, biphenyl, phenanthryl, anthryl or acenaphthyl and the like. The term "arylene", as used herein, relates to a bivalent radical aryl group as defined above. For example, an aryl group such as phenyl which would be represented as -Ph, becomes phenylene, -Ph-, when represented as an arylene. Other arylene groups should be understood accordingly.

For the avoidance of doubt, the reference to alkyl, alkenyl, alkynyl, aryl or aralkyl in composite groups herein should be interpreted accordingly, for example the reference to alkyl in aminoalkyl or alk in alkoxyl should be interpreted as alk or alkyl above etc.

The phosphorous acid suitably comprises phosphoric acid. Suitably, the phosphoric acid may be in the form of an aqueous solution. As a non-limiting example, the phosphoric acid may be in the form of an aqueous solution, such as orthophosphoric acid, which may be approximately 85.5 vol %, for example. As a further non-limiting example, the phosphoric acid may be 100 vol % phosphoric acid or super phosphoric acid. The phosphoric acid may be a condensation product such as, for example, pyrophosphoric acid, metaphosphoric acid or phosphoric anhydride.

The polyester material may comprise any suitable molar ratio of components (a):(b). In certain embodiments, the ratio of (a):(b) may range from about 5:1 to 1:5, such as from about 2:1 to 1:2, or even from about 1:1 to 1:2. Suitably, the molar ratio of (a):(b) in the polyester material may be about 1:1.

The phosphorous acid may be provided in any suitable amount. The phosphorous acid may be provided in amounts from about 0.1 to 1.0 equivalents of phosphorous acid per hydroxyl equivalent of the polyester material, suitably from about 0.2 to 0.5 P—OH groups per hydroxyl group.

In certain embodiments, the polyester material of the present invention may optionally include one or more additional monomers. Suitably, the polyester material of the present invention may optionally include one or more additional monomers selected from monoacids or monohydric alcohols or combinations thereof. Suitably, the additional monomers may be organic.

In certain embodiments, the polyester material may optionally include an additional monoacid. "Monoacid" and like terms as used herein, refers to compounds having one carboxylic acid group and includes an ester of the monoacid (where the acid group is esterified) or an anhydride. The monoacid is suitably an organic monoacid.

Suitable examples of monoacids include, but are not limited to one or more of the following: benzoic acid; cyclohexane carboxylic acid; tricyclodecane carboxylic acid; camporic acid; benzoic acid; t-butyl benzoic acid; $C_1$-$C_{18}$ aliphatic carboxylic acids such as acetic acid; propanoic acid; butanoic acid; hexanoic acid; oleic acid; linoleic acid; linolenic acid; undecanoic acid; lauric acid; isononanoic acid; stearic acid; palmitic acid; myristic acid; fatty acids; hydrogenated fatty acids of naturally occurring oils; esters and/or anhydrides of any of the aforementioned acids and combinations thereof.

In certain embodiments, the polyester material may further include an additional monohydric alcohol. "Monohydric alcohol" and like terms as used herein, refers to compounds having one hydroxyl group. Suitably, the monohydric alcohol is an organic monohydric alcohol.

Suitable examples of monoalcohols include but are not limited to one or more of the following: benzyl alcohol; hydroxyethoxybenzene; methanol; ethanol; propanol; butanol; pentanol; hexanol; heptanol; dodecyl alcohol; stearyl alcohol; oleyl alcohol; undecanol; cyclohexanol; 2-ethylhexyl alcohol; phenol; phenyl carbinol; methylphenyl carbinol; cresol; monoethers of glycols; halogen-substituted or other substituted alcohols and combinations thereof.

The polyester material may optionally comprise any suitable molar ratio of components (a)+(b) to one or more additional monomer. In certain embodiments, the polyester material may comprise a molar ratio of (a)+(b) to one or more additional monomer of from 100:1 to 1:1, suitably from 100:1 to 5:1, such as from 100:1 to 20:1, or even from 100:1 to 50:1.

The polyester material according to the present invention may have a number-average molecular weight (Mn) from about 1,000 Da to 25,000 Daltons (Da=g/mole). In certain embodiments, the polyester material may have an Mn of at least about 1,000 Da, suitably at least about 2,000 Da, such as at least 3,000 Da, such as at least about 5,000 Da, or even about 6,000 Da. In certain embodiments, the polyester material may have an Mn of up to about 10,000 Da, suitably up to about 15,000 Da, such as up to about 20,000 Da, or even up to about 25,000 Da. Suitably, the polyester material may have an Mn from about 1,000 Da to about 25,000 Da, suitably from about 2,000 Da to about 25,000 Da, such as from about 3,000 Da to about 20,000 Da, suitably from about 6,000 Da to about 15,000 Da, or even from about 6,000 Da to about 10,000 Da. Suitably, the polyester material may have an Mn from about 1,000 Da to about 10,000 Da, suitably from about 1,000 Da to about 15,000 Da, such as from about 1,000 Da to about 20,000 Da, or even from about 1,000 Da to about 25,000 Da. Suitably, the polyester material may have an Mn from about 2,000 Da to about 10,000 Da, suitably from about 2,000 Da to about 15,000 Da, such as from about 2,000 Da to about 20,000 Da, or even from about 2,000 Da to about 25,000 Da. Suitably, the polyester material may have an Mn from about 3,000 Da to about 10,000 Da, suitably from about 3,000 Da to about 15,000 Da, such as from about 3,000 Da to about 20,000 Da, or even from about 3,000 Da to about 25,000 Da. Suitably, the polyester material may have an Mn from about 5,000 Da to about 10,000 Da, suitably from about 5,000 Da to about 15,000 Da, such as from about 5,000 Da to about 20,000 Da, or even from about 5,000 Da to about 25,000 Da. Suitably, the polyester material may have an Mn from about 6,000 Da to about 10,000 Da, suitably from about 6,000 Da to about 15,000 Da, such as from about 6,000 Da to about 20,000 Da, or even from about 6,000 Da to about 25,000 Da.

Suitable methods for measuring the Mn of the polyester material will be well known to the person skilled in the art. As a non-limiting example, the Mn may be determined by gel permeation chromatography using a polystyrene standard. Suitably, the Mn may be determined by gel permeation chromatography using a polystyrene standard according to ASTM D6579-11 ("Standard Practice for Molecular Weight Averages and Molecular Weight Distribution of Hydrocarbon, Rosin and Terpene Resins by Size Exclusion Chromatography". Detector: Differential Refractometer, solvent: 5% acetic acid in dimethyl formamide, retention time marker: system peak, sample concentration: 8 mg/ml, column temperature: 80° C., injection volume: 100μL, flow rate: 1cm$^3$/min).

The polyester material according to the present invention may have any suitable weight-average molecular weight (Mw). In certain embodiments, the polyester material may have an Mw of at least about 1,500 Daltons (Da=g/mole), suitably at least about 5,000 Da, such as at least about 10,000 Da or even at least 20,000 Da. In certain embodiments, the polyester material may have an Mw of up to about 50,000 Da, such as about 100,000 Da, or even up to about 200,000 Da, or even up to about 300,000 Da. Suitably, the polyester material may have an Mw from about 1,500 Da to about 300,000 Da, more preferably from about 5,000 Da to about 200,000 Da, suitably from about 10,000 Da to about 200,000 Da, or even from about 20,000 Da to about 200,000 Da. Suitably, the polyester material may have an Mw from about 1,500 Da to about 50,000 Da, suitably from about 5,000 Da to about 50,000 Da, such as from about 10,000 Da to about 50,000 Da, or even from about 20,000 Da to about 50,000 Da. Suitably, the polyester material may have an Mw from about 1,500 Da to about 100,000 Da, suitably from about 5,000 Da to about 100,000 Da, such as from about 10,000 Da to about 100,000 Da, or even from about 20,000 Da to about 100,000 Da. Suitably, the polyester material may have an Mw from about 1,500 Da to about 200,000 Da, suitably from about 5,000 Da to about 200,000 Da, such as from about 10,000 Da to about 200,000 Da, or even from about 20,000 Da to about 200,000 Da. Suitably, the polyester material may have an Mw from about 1,500 Da to about 300,000 Da, suitably from about 5,000 Da to about 300,000 Da, such as from about 10,000 Da to about 300,000 Da, or even from about 20,000 Da to about 300,000 Da.

In certain embodiments, the polyester material may have an Mw from about 1,500 Da to about 300,000 Da.

The polyester material according to the present invention suitably has a low or medium degree of branching. The polyester materials according to the present invention may be substantially linear or be slightly branched. For example, the degree of branching of the polyester material may be measured by the polydispersity index of the said polyester material. The polydispersity index of a polymer is given by the ratio of Mw to Mn (Mw/Mn), wherein Mw is the weight-average molecular weight and Mn is the number average molecular weight.

The polydispersity index of the polyester material of the present invention is from about 1 to 10, suitably from about 1.3 to 10, such as from about 1.5 to 10, such as from about 1.5 to 6, or even from about 1.5 to 5.

The polyester material according to the present invention may have any suitable glass transition temperature (Tg). In certain embodiments, the Tg may be from about −20° C. to 150° C., suitably from about −20° C. to 120° C. Methods to measure Tg will be well known to a person skilled in the art. Suitably, the Tg is measured according to ASTM D6604-00(2013) ("Standard Practice for Glass Transition Temperatures of Hydrocarbon Resins by Differential Scanning Calorimetry".

Heat-flux differential scanning Calorimetry (DSC), sample pans: aluminium, reference: blank, calibration: indium and mercury, sample weight: 10 mg, heating rate: 20° C/min).

The polyester material according to the present invention may have any suitable hydroxyl value (OHV). In certain embodiments, the polyester material may have an OHV from about 0 to 120 mg KOH/g, suitably from about 0 to 50 mg KOH/g, such as from about 0 to 30 mg KOH/g.

The polyester material of the present invention may have any suitable acid value (AV). In certain embodiments, the polyester material may have an AV from about 0 to 100 mg KOH/g, preferably from about 0 to 50 mg KOH/g, most preferably from about 0 to 20 mg KOH/g.

The binder may contain any suitable amount of the polyester material. In certain embodiments, the binder composition may contain more than about 10 weight percent (wt %) of the polyester material based on the total solid weight of the binder composition. Suitably, the binder composition may contain from about 10 wt % to 100 wt % of the polyester material, such as from about 10 wt % to 99 wt % of the polyester material, or even from about 10 wt % to 90 wt % or from about 10 wt % to 80 wt % of the polyester material based on the total solid weight of the binder composition. In certain embodiments, the binder composition may contain more than about 20 wt %, suitably more than about 30 wt %, such as more that about 40 wt %, or even more that about 50 wt % of the polyester material based on the total solid weight of the binder composition. Suitably, the binder composition may contain from about 20 wt % to 100 wt % of the polyester material, such as from about 20 wt % to 99 wt % of the polyester material, or even from about 20 wt % to 90 wt % or from about 20 wt % to 80 wt % of the polyester material based on the total solid weight of the binder composition. Suitably, the binder composition may contain from about 30 wt % to 100 wt % of the polyester material, such as from about 30 wt % to 99 wt % of the polyester material, or even from about 30 wt % to 90 wt % or from about 30 wt % to 80 wt % of the polyester material based on the total solid weight of the binder composition. Suitably, the binder composition may contain from about 50 wt % to 100 wt % of the polyester material, such as from about 50 wt % to 99 wt % of the polyester material, or even from about 50 wt % to 90 wt % or from about 50 wt % to 80 wt % of the polyester material based on the total solid weight of the binder composition. Suitably, the binder composition may contain from about 50 wt % to 100 wt % of the polyester material, such as from about 50 wt % to 99 wt % of the polyester material, or even from about 50 wt % to 90 wt % or from about 50 wt % to 80 wt % of the polyester material based on the total solid weight of the binder composition.

In certain embodiments, the binder may comprise one or more further polymeric materials. Suitable further polymeric materials will be well known to a person skilled in the art. Suitable examples of further polymeric materials include, but are not limited to the following: polyester resins; acrylic resins; alkyd resins; polyurethane resins; polysiloxane resins; epoxy resins or combinations thereof. The one or more further polymeric materials, when present, may suitably be present in the binder composition in amounts from about 0 to 90 wt %, suitably from about 1 to 90 wt %, such as from about 10 to 90 wt %, or even from about 20 to 90 wt % based on the total solid weight of the binder composition.

The polyester material may be prepared by any suitable method. In certain embodiments, the polyester material may be prepared in a one step process. Suitably, in a one step process, the components (a), (b) and (c) are all reacted together at the same time.

In certain preferred embodiments, the polyester material may be prepared in a two step process. Suitably, in a two step process, components (a) and (b) are contacted together in a first step under first reaction conditions, then the remaining component (c) is contacted with the products of the first step in a second step under second reaction conditions.

Suitably, the polyester material may be formed in a two step process. The two step process may comprise the following steps:
a first step comprising preparing a polyester prepolymer by contacting
  (a) a polyacid,
  (b) a polyol, and
a second step comprising contacting the polyester prepolymer with
  (c) a phosphorous acid.

Therefore, according to a second aspect of the present invention there is provided a coating composition comprising a binder, the binder comprising a polyester material, wherein the polyester material comprises the reaction product of a two step process, the two step process comprising:
a first step comprising preparing a polyester prepolymer by contacting
  (a) a polyacid,
  (b) a polyol, and
a second step comprising contacting the polyester prepolymer with
  (c) a phosphorous acid,
wherein the polyester material has a weight-average molecular weight (Mn) from about 1,000 Da to 25,000 Da;
and wherein the polydispersity index (Mw/Mn) of the polyester material is from about 1 to 10;
characterised in that the polyester material is present in said binder composition in amounts of more than about 10 weight percent (wt %).

The first reaction conditions may include a temperature of between about 100° C. and 250° C., suitably at a temperature of between about 150° C. and 230° C. The temperature of between about 100° C. and 250° C., suitably between about 150° C. and 230° C. may be maintained for a time period of about 1 hour to 100 hours.

The second reaction conditions may include a temperature of between about 90° C. and 200° C., suitably at a temperature of between about 120° C. and 185° C., such as at a temperature of between about 150° C. and 175° C. The temperature of between about 90° C. and 200° C., suitably between about 120° C. and 185° C., such as 150° C. and 175° C. may be maintained for a time period of about 1 hour to 100 hours. It has been surprisingly and advantageously found by the present inventors that the second reaction conditions may include temperatures which are lower than would normally be expected.

The reaction to form the polyester material can be performed in the presence of an esterification catalyst. Suitable examples of esterification catalysts include, but are not limited to one or more of the following: tin, titanium and zinc catalysts such as dibutyl tin oxide (DBTO); monobutyl tin tris(2-ethyl hexanoate); stannous chloride; stannous oxalate; stannous octoate; butyl stannoic acid; tetra-n-butyl titanate; tetra isopropyl titanate; zinc acetate; zinc stearate and combinations thereof. In certain embodiments, the esterification catalyst, when present, may be present in amounts from about 0.005 wt % to 0.2 wt %, suitably from about 0.005 wt % to 0.1 wt % based on the total weight of monomers (i.e. components (a) and (b) and, when present, one or more additional monomers).

The features of the polyester material according to the second aspect of the present invention are as defined in relation to the first aspect of the present invention.

The polyester prepolymer according to the present invention may have any suitable number-average molecular weight (Mn). In certain embodiments, the polyester prepolymer may have an Mn of at least about 500 Daltons (Da=g/mole), suitably at least about 1,200 Da, or even about 2,500 Da, or even about 5,000 Da. In certain embodiments, the polyester prepolymer may have an Mn up to about 20,000 Da, such as up to about 25,000 Da, or even up to about 30,000 Da. Suitably, the polyester prepolymer may have an Mn from about 500 Da to about 30,000 Da, such as about 1,000 Da to about 25,000 Da, or even about 2,000 Da to about 20,000 Da. Suitably, the polyester prepolymer may have an Mn of from about 500 Da to about 30,000 Da, suitably from about 1,200 Da to about 30,000 Da, such as from about 2,500 Da to about 30,000 Da, or even from about 5,000 to 30,000 Da. Suitably, the polyester prepolymer may have an Mn of from about 500 Da to about 25,000 Da, suitably from about 1,200 Da to about 25,000 Da, such as from about 2,500 Da to about 25,000 Da, or even from about 5,000 to 25,000 Da. Suitably, the polyester prepolymer may have an Mn of from about 500 Da to about 20,000 Da, suitably from about 1,200 Da to about 20,000 Da, such as from about 2,500 Da to about 20,000 Da, or even from about 5,000 to 20,000 Da.

Suitable methods for measuring the Mn of the polyester prepolymer will be well known to the person skilled in the art. As a non-limiting example, the Mn may be determined by gel permeation chromatography using a polystyrene standard. Suitably, the Mn may be determined by gel permeation chromatography using a polystyrene standard according to ASTM D6579-11 ("Standard Practice for Molecular Weight Averages and Molecular Weight Distribution of Hydrocarbon, Rosin and Terpene Resins by Size Exclusion Chromatography". UV detector: 254nm, solvent: unstabilised THF, retention time marker: toluene, sample concentration: 2 mg/ml).

The polyester prepolymer according to the present invention may have any suitable weight-average molecular weight (Mw). In certain embodiments, the polyester prepolymer may have an Mw of at least about 500 Daltons (Da=g/mole), suitably at least about 1,500 Da, suitably at least about 3,000 Da, such as at least about 5,000 Da, or even at least about 15,000 Da. In certain embodiments, the polyester prepolymer may have an Mw of up to about 50,000 Da, suitably up to about 100,000 Da, such as up to about 150,000 Da, or even up to about 200,000 Da. Suitably, the polyester prepolymer may have an Mw from about 1,500 Da to about 200,000 Da, more preferably from about 5,000 Da to about 200,000 Da, suitably from about 15,000 Da to about 200,000 Da. Suitably, the polyester prepolymer may have an Mn from about 500 Da to about 50,000 Da, suitably from about 1,500 Da to about 50,000 Da, such as from about 3,000 Da to about 50,000 Da, such as from about 5,000 Da to about 50,000 Da, or even from about 15,000 Da to about 50,000 Da. Suitably, the polyester prepolymer may have an Mn from about 500 Da to about 100,000 Da, suitably from about 1,500 Da to about 100,000 Da, such as from about 3,000 Da to about 100,000 Da, such as from about 5,000 Da to about 100,000 Da, or even from about 15,000 Da to about 100,000 Da. Suitably, the polyester prepolymer may have an Mn from about 500 Da to about 150,000 Da, suitably from about 1,500 Da to about 150,000 Da, such as from about 3,000 Da to about 150,000 Da, such as from about 5,000 Da to about 150,000 Da, or even from about 15,000 Da to about 150,000 Da. Suitably, the polyester prepolymer may have an Mn from about 500 Da to about 200,000 Da, suitably from about 1,500 Da to about 200,000 Da, such as from about 3,000 Da to about 200,000 Da, such as from about 5,000 Da to about 50,000 Da, or even from about 15,000 Da to about 200,000 Da.

Techniques to measure the weight-average molecular weight will be well known to a person skilled in the art. Suitably, the Mw may be determined by gel permeation chromatography using a polystyrene standard.

The polyester prepolymer according to the present invention suitably has a low degree of branching. The polyester prepolymer according to the present invention may be substantially linear or be slightly branched. For example, the degree of branching of the polyester prepolymer may be measured by the polydispersity index of the said polyester prepolymer. The polydispersity index of a polymer is given by the ratio of Mw to Mn (Mw/Mn), wherein Mw is the weight-average molecular weight and Mn is the number-average molecular weight. Suitably, the polydispersity index of the polyester prepolymer of the present invention may be from about 1 to 10, suitably from about 1.3 to 10, such as from about 1.5 to 10, such as from about 1.5 to 6, or even from about 1.5 to 5, for example.

The polyester prepolymer according to the present invention may have any suitable glass transition temperature (Tg). In certain embodiments, the Tg may be from about −20° C. to 150 ° C., suitably from about −20° C. to 120° C. Methods to measure Tg will be well known to a person skilled in the art. Suitably, the Tg is measured according to ASTM D6604-00(2013) ("Standard Practice for Glass Transition Temperatures of Hydrocarbon Resins by Differential Scanning Calorimetry". Heat-flux differential scanning Calorimetry (DSC), sample pans: aluminium, reference: blank, calibration: indium and mercury, sample weight: 10 mg, heating rate: 20° C/min).

The polyester prepolymer according to the present invention may have any suitable hydroxyl value (OHV). In certain embodiments, the polyester material may have an OHV from about 0 to 300 mg KOH/g, suitably from about 0 to 150 mg KOH/g, such as from about 0 to 75 mg KOH/g.

The polyester prepolymer according to the present invention may have any suitable acid value (AV). In certain embodiments, the polyester material may have an AV from about 0 to 50 mg KOH/g, preferably from about 0 to 25 mg KOH/g, most preferably from about 0 to 10 mg KOH/g.

In certain embodiments, the degree of branching of the polyester prepolymer prepared in the first step may be substantially the same as the degree of branching of the polyester material prepared in the second step. Suitably, the polyester prepolymer prepared in the first step and the polyester material prepared in the second step may both have a low or medium degree of branching. For example, the degree of branching of the polyester prepolymer and the polyester material may be measured by the polydispersity index of the said polyester prepolymer and polyester material. The polydispersity index of a polymer is given by the ratio of Mw to Mn (Mw/Mn), wherein Mw is the weight-average molecular weight and Mn is the number average molecular weight.

In certain embodiments, the polydispersity index of the polyester material may be from about 0 to 5 units higher than the polydispersity index of the polyester prepolymer. Suitably, the polydispersity index of the polyester material may be from about 0 to 4 units higher than the polydispersity index of the polyester prepolymer, such as about 0 to 3 units higher than the polydispersity index of the polyester prepolymer or even about 0 to 2 units higher than the polydispersity index of the polyester prepolymer. In certain embodiments, the polydispersity index of the polyester material may be from about 0.5 to 5 units higher than the polydispersity index of the polyester prepolymer. Suitably, the polydispersity index of the polyester material may be from about 0.5 to 4 units higher than the polydispersity index of the polyester prepolymer, such as about 0.5 to 3 units higher than the polydispersity index of the polyester prepolymer or even about 0.5 to 2 units higher than the polydispersity index of the polyester prepolymer. In certain embodiments, the polydispersity index of the polyester material may be from about 1 to 5 units higher than the polydispersity index of the polyester prepolymer. Suitably, the polydispersity index of the polyester material may be from about 1 to 4 units higher than the polydispersity index of the polyester prepolymer, such as about 1 to 3 units higher than the polydispersity index of the polyester prepolymer or even about 1 to 2 units higher than the polydispersity index of the polyester prepolymer.

It has been surprisingly and advantageously found by the present inventors that the increase in the degree of branching on going from the first to the second step is lower than would normally be expected.

The coating composition according to the above aspects may comprise any suitable amount of binder. In certain embodiments, the coating composition may comprise from about 1 to 100 wt % of the binder composition based on the total solid weight of the coating composition. Suitably, the coating composition may comprise from about 20 to 90 wt % of the binder composition, suitably from about 20 to 99 wt %, such as from about 20 to 90 wt %, such as from about 30 to 90 wt %, or even from about 40 to 90 wt % of the binder composition, or even from about 50 to 90 wt % of the binder composition based on the total solid weight of the coating composition.

The coating composition may optionally comprise one or more solvent. The coating composition may comprise a single solvent or a mixture of solvents. The solvent may comprise water, an organic solvent, a mixture of water and an organic solvent or a mixture of organic solvents.

The organic solvent preferably has sufficient volatility to essentially entirely evaporate from the coating composition during the curing process. As a non-limiting example, the curing process may be by heating at about 130 to 250° C. metal temperature for 5 seconds to 15 minutes.

Suitable organic solvents include, but are not limited to one or more of the following: aliphatic hydrocarbons such as mineral spirits and high flash point naptha; aromatic hydrocarbons such as benzene; toluene; xylene; solvent naptha 100, 150, 200; those available from Exxon-Mobil Chemical Company under the SOLVESSO trade name; alcohols such as ethanol; n-propanol; isopropanol; and n-butanol; ketones such as acetone; cyclohexanone; methylisobutyl ketone; methyl ethyl ketone; esters such as ethyl acetate; butyl acetate; n-hexyl acetate; glycols such as butyl glycol; glycol ethers such as methoxypropanol; ethylene glycol monomethyl ether; ethylene glycol monobutyl ether and combinations thereof. The solvent, when present, may suitably be used in the coating composition in amounts from about 10 to 90 wt %, such as from about 20 to 80 wt %, or even from about 30 to 70 wt % based on the total solid weight of the coating composition.

The polyester material may be dissolved or dispersed in the said one or more solvent during and/or after its formation.

In certain embodiments the coating composition may further comprise a catalyst. Any catalyst typically used to catalyse crosslinking reactions between polyester materials and crosslinking agents, such as for example phenolic resins, may be used. Suitable catalysts will be well known to the person skilled in the art. Suitable catalysts include, but are not limited to one or more of the following: phosphoric acid; alkyl aryl sulphonic acids such as dodecyl benzene sulphonic acid; methane sulphonic acid; paratoluene sulphonic acid; dinonyl naphthalene disulphonic acid; phenyl phosphinic acid and combinations thereof. In certain embodiments the catalyst may comprise an acid catalyst. Suitably, the catalyst may comprise phosphoric acid. In certain embodiments, the catalyst, when present, may be used in amounts from about 0.01 to 5 wt %, preferably from about 0.05 to 2.5 wt %, more preferably from about 0.05 to 1.5 wt % based on the total solid weight of the coating composition. It has been advantageously found by the present inventors that the amount of acid catalyst, when present, used in the coating compositions is not as high as would normally be expected.

In certain embodiments, the coating composition may further comprise a crosslinking agent. The crosslinking agent may be any suitable crosslinking agent. Suitable crosslinking agents will be well known to the person skilled in the art. Suitable crosslinking agents include, but are not limited to one or more of the following: phenolic resins (or phenol-formaldehyde resins); aminoplast resins (or triazine-formaldehyde resins); amino resins; epoxy resins; isocyanate resins; beta-hydroxy (alkyl) amide resins; alkylated carbamate resins; polyacids; anhydrides; organometallic acid-functional materials; polyamines; polyamides and combinations thereof. In certain embodiments, the crosslinking agent comprises a phenolic resin, an aminoplast resin, an isocyanate resin or a combination thereof.

In certain embodiments, the crosslinking agent comprises a phenolic resin. Non-limiting examples of phenolic resins are those formed from the reaction of a phenol with formaldehyde. Non-limiting examples of phenols which may be used to form phenolic resins are phenol, butyl phenol, xylenol and cresol. General preparation of phenolic resins is described in "The Chemistry and Application of Phenolic Resins or Phenoplasts", Vol V, Part I, edited by Dr Oldring; John Wiley and Sons/Cita Technology Limited, London, 1997. Suitably, the phenolic resins are of the resol type. By "resol type" we mean resins formed in the presence of a basic (alkaline) catalyst and optionally an excess of formaldehyde. Suitable examples of commercially available phenolic resins are, but are not limited to PHENODUR® PR285 and PR612 and resins sold under the trademark BAKELITE® such as BAKELITE 6582 LB.

Non-limiting examples of aminoplast resins are those which are formed from the reaction of a triazine such as melamine or benzoguanamine with formaldehyde. Suitably, the resultant compounds may be etherified with an alcohol such as methanol, ethanol, butanol or combinations thereof. General preparation and use of aminoplast resins is described in "The Chemistry and Applications of Amino Crosslinking Agents or Aminoplast", Vol V, Part II, page 21 ff., edited by Dr Oldring; John Wiley and Sons/Cita Technology Limited, London, 1998. Suitable examples of commercially available aminoplast resins include but are not restricted to those sold under the trademark MAPRENAL® such as MAPRENAL® MF980 and those sold under the trademark CYMEL® such as CYMEL 303 and CYMEL 1128, available from Cytec Industries. Suitably, the crosslinking agent comprises a phenolic resin.

Suitable isocyanates include but are not restricted to multifunctional isocyanates. Suitable examples of multifunctional polyisocyanates include, but are not limited to one or more of the following: aliphatic diisocyanates like hexamethylene diisocyanate and isophorone diisocyanate; and aromatic diisocyanates like toluene diisocyanate and 4,4'-diphenylmethane diisocyanate. The polyisocyanates may be blocked or unblocked. Examples of other suitable polyisocyanates include, but are non limited to one or more of the following: isocyanurate trimmers; allophanates; uretdiones of diisocyanates; polycarbodiimides and combinations thereof. Suitable examples of commercially available polyisocyanates include but are not restricted to DESMODUR VP2078 and DESMODUR N3390, which are sold by Bayer Corporation, and TOLONATE HDT90, which is sold by Rhodia Inc.

In certain embodiments, the coating composition may optionally contain an additive or combination of additives. The coating composition may optionally contain any suitable additive or combination of additives. Suitable additives will be well known to the person skilled in the art. Examples of suitable additives include, but are not limited to one or more of the following; lubricants; pigments; plasticisers; surfactants; flow control agents; thixotropic agents; fillers; diluents; organic solvents and combinations thereof.

Suitable lubricants will be well known to the person skilled in the art. Suitable examples of lubricants include, but are not limited to one or more of the following, carnauba wax, lanolin and polyethylene type lubricants such as polytetrafluoroethylene (PTFE) wax. In certain embodiments, the lubricant, when present, may be used in the coating composition in amounts of at least 0.01 wt % based on the total solid weight of the coating composition.

Suitable pigments will be well known to the person skilled in the art. A suitable pigment may be, for example, titanium dioxide, zinc oxide or aluminium oxide. The pigment, when present, may be used in the coating composition in any suitable amount. In certain embodiments, the pigment, when present, may be used in the coating composition in amounts up to about 90 wt %, such as up to about 50 wt %, or even up to about 10 wt % based on the total solid weight of the coating composition.

Surfactants may optionally be added to the coating composition in order to aid in flow and wetting of the substrate. Suitable surfactants will be well known to the person skilled in the art. Suitably the surfactant, when present, is chosen to be compatible with food and/or beverage container applications. Suitable surfactants include, but are not limited to one or more of the following:, alkyl sulfates (e.g., sodium lauryl sulfate); ether sulfates; phosphate esters; sulphonates; and their various alkali, ammonium, amine salts; aliphatic alcohol ethoxylates; alkyl phenol ethoxylates (e.g. nonyl phenol polyether); salts and/or combinations thereof. The surfactants, when present, may be present in amounts from about 0.01 to 10 wt % based on the total solid weight of the coating composition.

In certain embodiments, the coating compositions according to the present invention may be substantially free, may be essentially free or may be completely free of bisphenol A (BPA) and derivatives thereof. Derivatives of bisphenol A include, for example, bisphenol A diglycidyl ether (BADGE), dihydroxyl bisphenol A diglycidyl ether (dihydroxyl BADGE) and cyclo di-bisphenol A diglycidyl ether (cyclo di-BADGE). In certain embodiments, the coating compositions according to the present invention may also be substantially free or completely free of bisphenol F (BPF) and derivatives thereof. Derivatives of bisphenol F include, for example, bisphenol F diglycidyl ether (BPFG). The compounds or derivatives thereof mentioned above may not be added to the composition intentionally but may be present in trace amounts because of unavoidable contamination from the environment. By "substantially free" we mean to refer to coating compositions containing less than about 1000 parts per million (ppm) of any of the compounds or derivatives thereof mentioned above. By "essentially free" we mean to refer to coating compositions containing less than about 100 ppm of any of the compounds or derivatives thereof mentioned above. By "completely free" we mean to refer to coating compositions containing less than about 20 parts per billion (ppb) of any of the compounds or derivatives thereof.

In certain embodiments, the coating compositions may be essentially fee or may be completely free of trialkyltin oxides or derivatives thereof. Examples of trialkyltin oxides include, but are not limited to one or more of the following: trimethyltin oxide; triethyltin oxide; tripropyltin oxide; tributyltin oxide or combinations thereof. By "substantially free" we mean to refer to coating compositions containing less than about 1000 parts per million (ppm) of any of the compounds or derivatives thereof mentioned above. By "essentially free" we mean to refer to coating compositions containing less than about 100 ppm of any of the compounds or derivates thereof mentioned above. By "completely free" we mean to refer to coating compositions containing less than about 20 parts per billion (ppb) of any of the compounds or derivatives thereof.

The coating composition according to the present invention may be applied to any suitable container. In certain embodiments, the coating compositions may be applied to food and/or beverage containers. Suitably, the coating compositions may be applied to food and/or beverage cans. Examples of cans include, but are not limited to one or more of the following, two-piece cans, three-piece cans and the like. Suitably, the coating compositions may be applied to at least a part or portion of the container, such as a food and/or beverage container. The coating compositions may also be applied to containers for aerosol applications such as, but not limited to, deodorant and hair spray containers. Suitably, the coating compositions may be applied to at least a part or portion of the container, such as deodorant and hair spray containers.

The coating composition may be applied to the food and/or beverage container by any suitable method. Methods of applying said coating compositions will be well known to a person skilled in the art. Suitable application methods include, but are not limited to one or more of the following:

spray coating; roll coating; dipping; and/or electrocoating. It will be appreciated by the person skilled in the art that for two-piece cans, one or more of the coating compositions may typically be applied by spray coating after the can is made. It will also be appreciated by the person skilled in the art that for three-piece cans, a flat sheet may typically be roll coated with one or more of the present coating compositions first and then the can may be formed. However, the application of the coating compositions is not limited to these methods. The coating compositions according to the present information may be applied to the interior and/or exterior surface or surfaces of the container. Suitably, all or part of the surface may be covered.

The coating composition according to the present invention may be applied to any suitable dry film thickness. In certain embodiments the coating compositions may be applied to a dry film thickness from about 0.1 µm (microns) to 1 mm, preferably from about 2 µm to 100 µm, more preferably from about 4 µm to 50 µm, or even from about 4 µm to 20 µm.

The coating composition according to the present invention may be applied to a substrate as a single layer or as part of a multi layer system. In certain embodiments, the coating composition may be applied as a single layer. In certain embodiments, the coating composition may be applied as the first coat of a multi coat system. Suitably, the coating composition may be applied as an undercoat or a primer. The second, third, fourth etc. coats may comprise any suitable paint such as those containing, for example, epoxy resins; polyester resins; polyurethane resins; polysiloxane resins; hydrocarbon resins or combinations thereof. In certain embodiments, the coating compositions may be applied on top of another paint layer as part of a multi layer system. For example, the coating composition may be applied on top of a primer. The coating compositions may form an intermediate layer or a top coat layer. The coating composition may be applied to a substrate once or multiple times.

According to a further aspect of the present invention there is provided a coated article, coated on at least a portion thereof with a coating composition of the present invention.

According to a further aspect of the present invention there is provided a food or beverage container coated on at least a part or portion thereof with a coating composition according to any previous aspect.

All of the features contained herein may be combined with any of the above aspects and in any combination.

For a better understanding of the invention, and to show how embodiments of the same may be carried into effect, reference will now be made, by way of example, to the following experimental data.

EXAMPLES

Preparation of Polyester Prepolymers

Prepolymer Example 1

The polymerisation was carried out in a reaction vessel equipped with heating, cooling, stirring and a reflux condenser. A sparge of nitrogen was applied to the reactor to provide an inert atmosphere. 1301 g ethylene glycol (EG), 1888.7 g 2-methyl-1,3-propanediol (MPD), 5976 g terephthalic acid (TPA), 664 g isophthalic acid (IPA), and 4.94 g butyl stannoic acid (0.05% on charge) were charged to a reactor and heated to about 170° C. via a packed column. This mixture was processed until there was approximately 1150 g of distillate and then 300 g of xylene was added, changing the distillation to azeotropic distillation. The mixture was further processed at a maximum reactor temperature of 230° C. until resin clarity was achieved and the acid value (AV) was less than 10. The reactor was cooled to 180° C. so that the net hydroxyl value (OHV) could be sampled and measured. The OHV was adjusted to 32.2 with MPD and the mixture was processed for 2 hours at 180° C. After this time, the OHV was sampled and measured again and further adjusted if required. When the OHV was 32.2 the reactor was reheated to distillation with a maximum temperature of 230° C. The process was allowed to continue until the AV was <1. The in-process viscosity was measured using a CAP-2000+ viscometer and GPC. The resin was discharged from the reactor at 200° C. into PTFE trays. The properties of the prepolymer are shown in Table 1.

Prepolymer Example 2

The polymerisation was carried out in a reaction vessel equipped with heating, cooling, stirring and a reflux condenser. A sparge of nitrogen was applied to the reactor to provide an inert atmosphere. 3813.8 g 1,2-propylene glycol (1,2PG), 3553.4 g terephthalic acid (TPA), 3681.9 g 1,4-cyclohexane dicarboxylic acid and 5.89 g 94 g butyl stannoic acid (0.05% on charge) were charged to a reactor and heated to about 165° C. via a packed column. The mixture was processed at a maximum reactor temperature of 230° C. and a maximum head temperature of 100° C. The reactor was cooled to 140° C. before 2.1 g 2-methylhydroquinone (0.3% on maleic anhydride) was charged to the reactor. After 10 minutes 701 g maleic anhydride was also added. The reactor was reheated to distillation at a maximum temperature of 200° C. 650 g xylene was then added to convert the reaction to azeotropic distillation. The mixture was processed until resin clarity was achieved and the AV was between 20 and 30. The reactor was then cooled to 140° C. so that the net hydroxyl value (OHV) could be sampled and measured. The OHV was adjusted to 6.1 with 1,2PG and the mixture was further processed for 2 hours at 180° C. After this time, the OHV was sampled and measured again and further adjusted if required. When the OHV was 6.1 the reactor was reheated to distillation with a maximum temperature of 200° C. The process was allowed to continue until the AV was between 5 and 6. The in-process viscosity was measured using a CAP-2000+ viscometer and GPC. The resin was discharged from the reactor at 190° C. into PTFE trays. The properties of the prepolymer are shown in Table 1.

Preparation of Polyesters

Comparative Example 3

Polymerisation was carried out in a reaction vessel equipped with heating, cooling, stirring and a reflux condenser. A sparge of nitrogen was applied to the reactor to provide an inert atmosphere. 3813.8 g 1,2-propylene glycol (1,2PG), 3553.5 g terephthalic acid (TPA), 3681.9 g 1,4-cyclohexane dicarboxylic acid and 5.89 g 94 g butyl stannoic acid (0.05% on charge) were charged to a reactor and heated to about 165° C. via a packed column. The mixture was processed at a maximum reactor temperature of 230° C. and a maximum head temperature of 100° C. The reactor was cooled to 140° C. before 2.1 g 2-methylhydroquinone (0.3% on maleic anhydride) was charged to the reactor. After 10 minutes 701 g maleic anhydride was also added. The reactor was reheated to distillation at a maximum temperature of 200° C. 650 g xylene was then added to convert the reaction to azeotropic distillation. The mixture was processed until resin clarity was achieved and the AV was between 20 and 30. The reactor was then cooled to 140° C. so that the net hydroxyl value (OHV) could be sampled and measured. The OHV was adjusted to 6.1 with 1,2PG and the mixture was further processed for 2 hours at 180° C. After this time, the OHV was sampled and measured again and further adjusted if required. When the OHV was 6.1 the reactor was reheated to distillation with a maximum temperature of 200° C. The process was allowed to continue until the AV was between 5 and 6. The in-process viscosity was measured using a CAP-2000+ viscometer and GPC. The resin was discharged from the reactor at 190° C. into PTFE trays. The properties of the polymer are shown in Table 1.

Example 4

The polymerisation was carried out in a reaction vessel equipped with heating, cooling, stirring and a reflux condenser. A sparge of nitrogen was applied to the reactor to provide an inert atmosphere. 250 g Solvesso 100 (available from Exxon-Mobil Chemical Company) was charged to a reactor and heated to 120° C. The prepolymer of example 1 was broken into small pieces and charged to the reactor over 1 hour with vigorous stirring to ensure the resin was fully dissolved. 13.64 g of phosphoric acid (85% solution) was charged to the reactor followed by 1 g demineralise water as a rinse. The reactor was heated to distillation to approximately 155° C. to remove the water distillate. The distillation process was continued at a temperature up to 172 ° C. The quantity of water distillate, AV and viscosity were monitored throughout. The properties of the polymer are shown in Table 1.

Example 5

The polymerisation was carried out in a reaction vessel equipped with heating, cooling, stirring and a reflux condenser. A sparge of nitrogen was applied to the reactor to provide an inert atmosphere. 287.1 g Solvesso 100 (available from Exxon-Mobil Chemical Company) was charged to a reactor and heated to 120° C. The prepolymer of example 2 was broken into small pieces and charged to the reactor over 1 hour with vigorous stirring to ensure the resin was fully dissolved. 1.1 g of phosphoric acid (85% solution) was charged to the reactor followed by 1 g demineralise water as a rinse. The reactor was heated to distillation to approximately 163° C. to remove the water distillate. The distillation process was continued at a temperature up to 168 ° C. The quantity of water distillate, AV and viscosity were monitored throughout. The properties of the polymer are shown in Table 1.

Comparative Example 6

The polymerisation was carried out in a reaction vessel equipped with heating, cooling, stirring and a reflux condenser. A sparge of nitrogen was applied to the reactor to provide an inert atmosphere. 268.3 g Solvesso 150 ND (available from Exxon-Mobil Chemical Company) was charged to a reactor and heated to 120° C. 1008.6 g of the prepolymer of example 2 was broken into small pieces and charged to the reactor over 1 hour with vigorous stirring to ensure the resin was fully dissolved. 2.15 g of trimellitic anhydride (TMA) was charged to the reactor. The reactor was heated to distillation to approximately 184° C. to remove the water distillate. The distillation process was continued at a temperature up to 189° C. The quality of water distillate, AV and viscosity were monitored throughout. Resin samples were taken after 2.5 hours under these conditions to measure AV, viscosity and Mw/Mn. The remaining resin gelled in the reactor after a further 20 minutes of processing. The properties of the polymer sample 5 are shown in Table 1.

Comparative Example 7

Comparative example 6 was repeated except that the resin samples were taken after 3 hours. The properties of the polymer sample 5 are shown in Table 1.

TABLE 1

Properties of Prepolymers and Polymers

|  | Prepolymer Example 1 | Prepolymer Example 2 | Comparative Example 3 | Example 4 | Example 5 | Comparative Example 6 | Comparative Example 7 |
|---|---|---|---|---|---|---|---|
| Solids content[1] | 97.1% | 94.3% | 94.3% | 80.5% | 79.3% | 75 | 75 |
| Acid Value (AV) | 0.4 | 5.6 | 4.5 | 8.0 | 4.4 | 4.5 | 4.3 |
| Viscosity[2] | 90 poise | 885 poise | 1890 poise | 1440 poise | 2730 poise | 2070 poise | 3450 poise |
| Net hydroxyl value (OHV) | 27.1 | 2.6 | 1.8 | — | — | — | — |
| Gross OHV | 27.5 | 8.2 | 6.3 | — | — | — | — |
| Mn (GPC)[3] | 7,600 | 17,690 | 17,540 | 11,530 | 20,220 | 20,120 | 23,850 |
| Mw (GPC)[3] | 14,470 | 44,430 | 60,230 | 22,300 | 81,800 | 125,700 | 149,300 |
| Mw/Mn | 1.904 | 2.512 | 3.434 | 1.935 | 4.045 | 6.247 | 6.260 |
| Appearance | Hard, brittle pale yellow solid | Hard, brittle pale brown solid | Hard, brittle pale brown solid | Soft, light brown semi solid | Soft, light brown semi solid | Soft, light brown semi solid | Soft, light brown semi solid |

[1]Solids content was determined at 180° C. for 30 mins using 0.5 g resin samples diluted in 10 g dichloromethane. The measurements were taken in triplicate with the average value recorded.
[2]Viscosity was measured on a CAP2000+ viscometer with the following settings; 180° C., spindle 6, 5 rpm, 20 seconds hold/40 seconds run, pumped 10 × 15 times.
[3]The GPC was measure at high temperature using styrene as the reference.

Polymer example 4 is the reaction product of saturated prepolymer example 1 with phosphoric acid. Surprisingly, and as shown in Table 1, the number-average molecular weight (Mn) and weight-average molecular weight (Mw) of polymer example 4 have significantly increased compared to prepolymer example 1. However, there has been very little change in the polydispersity index (Mw/Mn).

Polymer example 5 is the reaction product of polyester prepolymer example 2 with phosphoric acid. Comparative example 3 was made using conventional methods for producing polyester polymers and has the same composition as prepolymer example 2. However, comparative example 3 has slightly lower Mn and a higher Mw compared to prepolymer example 2. As shown in Table 1, polymer example 5 has a significantly higher weight-average molecular weight (Mw) than the starting prepolymer example 2. However, there is only a slight increase in the polydispersity index (Mw/Mn) compared to that of comparative example 3.

Furthermore, polymer example 4 and polymer example 5 were prepared at much lower reaction temperatures and significantly reduced process times than typically required in traditional polyester preparations of similar Mw polymers.

Comparative examples 6 and 7 are the reaction product of polyester prepolymer example 2 with trimellitic anhydride. As shown in Table 1, comparative examples 6 and 7 have an increased polydispersity index (Mw/Mn) compared to that of the inventive examples.

Preparation of Coatings
Comparative Coating Compositions 1-2 and 5-8

550 g of the solid prepolymer prepared in example 1 was dissolved in 387.4 g SOLVESSO 100 (available from Exxon-Mobil Chemical Company), 85.9 g 1-methoxy-2-propanol and 172.3 g propylene carbonate preheated to 80-90° C. to form Resin A. Resin A therefore contains no phosphorous acid.

Comparative coating compositions 1-2 and 5-8 were then prepared using Resin A as outlined in Tables 2 and 3.
Coating Compositions 3-4 and 9-12

1220 g of the solid polyester polymer prepared in example 4 was dissolved in 421.4 g SOLVESSO 100 (available from Exxon-Mobil Chemical Company), 146.6 g 1-methoxy-2-propanol and 294.3 g propylene carbonate preheated to 80-90° C. to form Resin B. Resin B therefore contains phosphorous acid.

Coating compositions 3-4 and 9-12 were then prepared using Resin B as outline in Tables 2 and 3.
Comparative Coating Compositions 13-16

450 g of the solid polyester polymer prepared in comparative example 3 was dissolved in 192.5 g of SOLVESSO 100, 192.5 g SOLVESSO 150ND (naphthalene depleted grade of SOLVESSO 150 also available from Exxon-Mobile Chemical Company), 165.0 g of RHODIASOLV RPDE (available from Rhodia Inc.) preheated to 80-90° C. to form Resin C. Resin C therefore contains no phosphoric acid.

Coating compositions 17-20 were then prepared using Resin C as outlined in Table 4.
Coating Compositions 17-20

950 g of the solid polyester polymer prepared in example 5 was dissolved in 286.2 g of SOLVESSO 150ND, 245.7 g of RHODIASOLV RPDE preheated to 80-90° C. to form Resin D. Resin D therefore contains phosphoric acid.

Coating compositions 17-20 were then prepared using Resin D as outlined in Table 4.

The coatings were assessed according to the following tests:

Test Panel Preparation: The coating compositions were applied onto 0.22 mm tinplate panels using a wire wound bar coater to give a 5-6 g/sqare meter dried coating weight. The coated panels were transferred to a laboratory box oven for 10 minutes at 190° C.

MEK Rub Test: The number of reciprocating rubs required to remove the coating was measured using a ball of cotton wool soaked in methyl ethyl ketone (MEK).

Wedge Bend Test: A 10cm×4cm coated panel was bent on a 6 mm steel rod to form a U-shaped strip 10 cm long and 2 cm wide. The U-shaped strip was then placed onto a metal block with a built in tapered recess. A 2 kg weight was dropped onto the recessed block containing the U-shaped strip from a height of 60 cm in order to from a wedge. The test piece was then immersed in a copper sulphate ($CuSO_4$) solution acidified with hydrochloric acid (HCl) for 2 minutes, followed by rinsing with tap water. The sample was then carefully dried by blotting any residual water with tissue paper. The length of coating without any fracture was measured. The result was quoted in mm passed. The wedge bends were tested in triplicate and the average value was quoted.

Acid Retort Wedge Bend Test: Wedge bend test pieces were prepared as described above and placed in a high temperature resistant glass jar filled with a solution of 3% acetic acid and 2% salt dissolved in de-ionized water. The immersed wedge bends were sterilized for 1 hour at 130° C. in an autoclave. Immediately after sterilization the wedge bends were taken out of the acid solution, rinsed in tap water and dried with a paper tissue. A strip of Scotch 610 tape was firmly placed along the entire length of the wedge bend with any air bubbles trapped underneath the tape removed to ensure good contact with the coating. The tape was then quickly peeled off to remove any coating that had no longer adhered to the metal substrate as a result of the acid sterilization. The taped wedge bend was then immersed in acidified copper sulphate solution, rinsed, dried and graded in the same way as in the Wedge Bend Test.

TABLE 2

Properties of coating compositions from Resin A and Resin B with varying amounts of phosphoric acid as a catalyst

|  | Comparative Coating 1 | Comparative Coating 2 | Coating 3 | Coating 4 |
|---|---|---|---|---|
| Resin A | 71.7 | 71.5 | — | — |
| Resin B | — | — | 69.6 | 69.5 |
| Phenolic* | 13.4 | 13.4 | 13.4 | 13.4 |
| Catalyst** | — | 1.6 | — | 1.6 |
| BYK 310*** | 0.1 | 0.1 | 0.1 | 0.1 |
| 1-methoxy-2-propanol | 14.8 | 13.4 | 16.9 | 15.5 |
| Total | 100 | 100 | 100 | 100 |
| MEK Rubs | 1 | 2 | 38 | 38 |
| Wedge Bend | 0 | 83 | 96 | 98 |

*Phenodur PR516 (previously available from CYTEC Industries Inc. now available from ALLNEX USA Inc. under the same trade name)

**Solution of ortho-phosphoric acid in 1-methoxy-2-propanol prepared by mixing 5.88 g of 85% strength ortho-phosphoric acid (available from most suppliers of fine chemicals) in 94.12 g 1-methoxy-2-propanol

***BYK 310 is available from BYK-Chemie GmbH

TABLE 3

Properties of coating compositions from Resin A and Resin B with varying amounts of phenolic resin

|  | Comparative Coating 5 | Comparative Coating 6 | Comparative Coating 7 | Comparative Coating 8 | Coating 9 | Coating 10 | Coating 11 | Coating 12 |
|---|---|---|---|---|---|---|---|---|
| Resin A | 79.5 | 71.5 | 59.6 | 51.0 | — | — | — | — |
| Resin B | — | — | — | — | 77.4 | 69.6 | 58.0 | 49.7 |
| Phenolic* | 7.4 | 13.4 | 22.3 | 28.6 | 7.4 | 13.4 | 22.3 | 28.7 |
| Catalyst** | 1.6 | 1.6 | 1.6 | 1.6 | 1.6 | 1.6 | 1.6 | 1.6 |
| BYK 310*** | 0.1 | 0.1 | 0.1 | 0.1 | 0.1 | 0.1 | 0.1 | 0.1 |
| 1-methoxy-2-propanol | 11.4 | 13.4 | 16.5 | 18.7 | 15.0 | 16.9 | 19.6 | 21.6 |
| Total | 100 | 100 | 100 | 100 | 100 | 100 | 100 | 100 |
| MEK Rubs | 2 | 2 | 37 | 193 | 4 | 38 | >200 | >200 |
| Wedge Bend | 12 | 83 | 65 | 53 | 94 | 96 | 95 | 83 |

*Phenodur PR516 (previously available from CYTEC Industries Inc. now available from ALLNEX USA Inc. under the same trade name)
**Solution of ortho-phosphoric acid in 1-methoxy-2-propanol prepared by mixing 5.88 g of 85% strength ortho-phosphoric acid (available from most suppliers of fine chemicals) in 94.12 g 1-methoxy-2-propanol
***BYK 310 is available from BYK-Chemie GmbH

TABLE 4

Properties of coating compositions from Resin C and Resin D with varying amounts of phenolic resin

|  | Comparative Coating 13 | Comparative Coating 14 | Comparative Coating 15 | Comparative Coating 16 | Coating 17 | Coating 18 | Coating 19 | Coating 20 |
|---|---|---|---|---|---|---|---|---|
| Resin C | 82.4 | 73.9 | 61.2 | 52.3 | — | — | — | — |
| Resin D | — | — | — | — | 82.0 | 73.4 | 60.6 | 51.7 |
| Phenolic* | 7.7 | 13.7 | 22.7 | 29.1 | 7.8 | 14.0 | 23.1 | 29.5 |
| Catalyst** | 3.1 | 3.1 | 3.1 | 3.1 | 3.1 | 3.1 | 3.1 | 3.1 |
| BYK 310*** | 0.1 | 0.1 | 0.1 | 0.1 | 0.1 | 0.1 | 0.1 | 0.1 |
| 1-methoxy-2-propanol | 6.8 | 9.2 | 12.8 | 29.1 | 7.0 | 9.5 | 13.1 | 15.6 |
| Total | 100.0 | 100.0 | 100.0 | 100.0 | 100.0 | 100.0 | 100.0 | 100.0 |
| Wedge Bend | 94 | 90 | 84 | 75 | 94 | 96 | 95 | 83 |
| Acid Retort Wedge Bend | 6 | 33 | 18 | 26 | 77 | 74 | 58 | 56 |

*Phenodur PR516 (previously available from CYTEC Industries Inc. now available from ALLNEX USA Inc. under the same trade name)
**Solution of ortho-phosphoric acid in 1-methoxy-2-propanol prepared by mixing 5.88 g of 85% strength ortho-phosphoric acid (available from most suppliers of fine chemicals) in 94.12 g 1-methoxy-2-propanol
***BYK 310 is available from BYK-Chemie GmbH The results in Tables 2 and 3 show that the coating compositions comprising Resin A (coatings 3-4 and 9-12), i.e. those comprising polyester material that contains phosphorous acid, display higher MEK rubs and significantly better wedge bend performance than the comparative coating compositions comprising Resin B (comparative coatings 1-2 and 5-8), i.e. those comprising polyester material that does not contain phosphorous acid.

Results with varying amount of phenolic in the coating composition as shown in Table 3 further demonstrates the superior performance of Resin B (Coatings 13-16) compared to Resin A (Coatings 9-12).

One requirement for coating compositions is the ability to withstand retort conditions after fabrication of the coated substrate into, for example, food and/or beverage containers. Retort conditions may comprise temperatures of up to 130° C. and acidic media. As shown in Table 4, the coating compositions according to the present invention (coatings 17-20) show an improved adhesion performance after retort in 3% acetic acid and 1% salt solution compared to the comparative coating compositions (comparative coatings 13-16).

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A coating composition comprising a binder, the binder comprising a polyester material, wherein the polyester material comprises the reaction product of:
   a polyester prepolymer formed by reaction of (a) a polyacid and (b) a polyol; and
   a phosphorous acid,
   wherein the polyester material has a number-average molecular weight (Mn) from about 5,000 Da to 25,000 Da, a polydispersity index (Mw/Mn) of from about 1 to 10 and is present in said binder in amounts of more than about 10 weight percent (wt %).

2. The coating composition according to claim 1, wherein the polyacid comprises terephthalic acid, isophthalic acid, maleic anhydride, itaconic acid, 1,4-cyclohexane dicarboxylic acid, adipic acid, succinic acid, succinic anhydride, sebacic acid or a combination thereof.

3. The coating composition according to claim 2, wherein the polyacid comprises terephthalic acid, isophthalic acid, 1,4-cyclohexane dicarboxylic acid, maleic anhydride, itaconic acid or a combination thereof.

4. The coating composition according to claim 2, wherein the polyacid comprises 1,4-cyclohexane dicarboxylic acid, terephthalic acid, isophthalic acid, adipic acid, succinic acid, succinic anhydride, sebacic acid or a combination thereof.

5. The coating composition according to claim 1, wherein the polyol comprises ethylene glycol, 2-methyl-1,3-propanediol, 1, 2 propanediol, cyclohexanedimethanol (CHDM), trimethylol propane or glycerol or a combination thereof.

6. The coating composition according to claim 1, wherein the phosphorous acid comprises phosphoric acid.

7. The coating composition according to claim 1, wherein the molar ratio of (a):(b) ranges from 5:1 to 1:5.

8. The coating composition according to claim 1, wherein the phosphorous acid is provided in amounts from 0.1 to 1.0 equivalents of phosphorous acid per hydroxyl equivalent of the polyester material.

9. The coating composition according to claim 1, wherein the polyester material has a weight-average molecular weight (Mw) from 1,500 Da to about 300,000 Da.

10. The coating composition according to claim 1, wherein the coating composition further comprises a cross-linking agent.

11. A coating composition comprising a binder, the binder comprising a polyester material, wherein the polyester material comprises the reaction product of a two step process, the two step process comprising:
    a first step comprising preparing a polyester prepolymer by contacting
    (a) a polyacid,
    (b) a polyol, and
    a second step comprising contacting the polyester prepolymer with
    (c) a phosphorous acid,
    wherein the polyester material has a number-average molecular weight (Mn) from about 2,000 Da to 25,000 Da, a polydispersity index (Mw/Mn) of from about 1 to 10 and is present in said binder in amounts of more than about 10 weight percent (wt %).

12. The coating composition according to claim 11, wherein reaction conditions of the first step include a temperature of between 100° C. and 250° C.

13. The coating composition according to claim 12, reaction conditions of the second step include a temperature of between 90° C. and 200° C.

14. The coating composition according to claim 11, wherein the polydispersity index of the polyester material is from 0 to 5 units higher than the polydispersity index of the polyester prepolymer.

15. A coated article coated on at least a portion thereof with a coating composition according to claim 1.

16. A food or beverage container coated on at least a portion thereof with a coating composition according to claim 1.

17. A coated article coated on at least a portion thereof with a coating composition according to claim 11.

18. A food or beverage container coated on at least a portion thereof with a coating composition according to claim 11.

* * * * *